United States Patent [19]

Antonazzi et al.

[11] Patent Number: 4,457,179
[45] Date of Patent: Jul. 3, 1984

[54] DIFFERENTIAL PRESSURE MEASURING SYSTEM

[75] Inventors: Frank J. Antonazzi; Joseph A. Bluish, both of South Bend, Ind.

[73] Assignee: The Bendix Corporation, Southfield, Mich.

[21] Appl. No.: 244,184

[22] Filed: Mar. 16, 1981

[51] Int. Cl.³ .............................................. G01L 9/12
[52] U.S. Cl. ........................................ 73/701; 73/718
[58] Field of Search ................. 73/718, 701, 724, 708; 361/283, 284; 324/60 C

[56] References Cited

U.S. PATENT DOCUMENTS

| | | | |
|---|---|---|---|
| 3,237,178 | 2/1966 | Valentine | 73/304 C |
| 3,595,084 | 7/1971 | Bailey et al. | 73/718 X |
| 3,657,630 | 4/1972 | Fiet | 73/718 X |
| 3,858,097 | 12/1974 | Polye | 73/708 X |
| 4,001,813 | 1/1977 | Kosakowski | 324/60 C X |
| 4,153,873 | 5/1979 | Grindheim | 324/60 R |
| 4,322,977 | 4/1982 | Sell et al. | 73/701 |

*Primary Examiner*—Gerald Goldberg
*Assistant Examiner*—John E. Chapman, Jr.
*Attorney, Agent, or Firm*—William A. Marvin; Ken C. Decker

[57] ABSTRACT

A differential pressure measuring system is disclosed. The system includes two quartz capacitive pressure transducers (14, 16). Each capsule contains a pressure sensitive capacitor (Csa, Csb) and a relatively pressure invariable reference capacitor (Cra, Crb). The pressure sensitive capacitors (Csa, Csb) are excited by out-of-phase signals, (Vr, −Vr) which further excite the reference capacitors (Cra, Crb), out of phase, respectively. The outputs of all capacitors are combined in a summing junction (22) whose output controls the count of a digital integrator (34). A closed loop is formed by converting the output of the integrator (34) to a negative feedback signal (If) which is applied to the summing junction (22) through a feedback capacitor (Cf). The integrator (34) incrementally changes the feedback signal (If) in a direction to balance the loop. At this point the output of the integrator (34) is representative of the measured differential pressure.

11 Claims, 10 Drawing Figures

FIG. 10

DIFFERENTIAL PRESSURE MEASURING SYSTEM

The invention pertains generally to a differential pressure measuring system and is more particularly directed to such differential pressure measuring systems that utilize quartz capacitive pressure transducers in a closed loop system.

In the field of pressure measurement there are many devices known to provide an advantageous transduction of pressure into an electrical signal. These pressure transducer systems generally include a pressure sensitive element that modulates an electrical characteristic of the transducer with respect to changes in pressure. The variances in the electrical characteristic, which for example, may be a resistance, inductance, capacitance, or a similar parameter, are thereafter demodulated by an electrical circuit to generate an electrical signal as a function of the measured pressure.

One particularly advantageous absolute pressure measuring system is described in a co-pending application, U.S. Ser. No. 153,129 now U.S. Pat. No. 4,322,977, entitled: "Pressure Measuring System" filed on May 27, 1980, in the name of Robert C. Sell, John R. Sheler, and John M. Juhasz. The disclosure of Sell et al. is hereby incorporated by reference herein.

The referenced application discloses a highly accurate pressure measuring system which incorporates a closed loop feeback system and yields a digital output. The previously developed system comprises a pressure sensitive capacitor and a stable reference capacitor, contained within an absolute pressure sensing tranducer capsule. The pressure sensitive capacitor and reference capacitor are excited by sinusoidal signals 180° out of phase with each other. The outputs of the capsule are connected to a summing junction thereby producing a differential signal which is proportional to changes in the measured pressured. The summing junction generates an error signal which is amplified and processed by appropriate filters and an integrator to provide an output which excites a similar feedback tranducer capsule in a negative feedback loop to another input of the summing junction. The output current from the feedback capsule is utilized to null or balance the differential signal and is thus a measure of the pressure sensed when the summing junction output is zero.

Additionally, the feedback loop includes a digital counter for the direct measurement of the number of the discrete increments of feedback signal necessary to null the output of the summing junction. The digital readout of the counter is thereby directly proportional to the desired pressure measurement. This system is quite advantageous in the measurement of a single absolute pressure.

There are, however, many instances in which a pressure differential is desired to be measured. This is particularly the case in the control of gas turbine engines for aircraft or other uses. Differential pressure measurements can be used to calculate such engine operating variables as engine mass airflow, Mach number, engine pressure ratio, and surge margin. These variables then comprise the basic parameters from which to control fuel flow and engine power. But the problem of obtaining a differential pressure measurement from which to calculate these basic parameters has not proved easy to solve.

In a straightfoward manner, many in the art have used dual absolute pressure measuring channels, one for each pressure, and thereafter differenced the resultant pressure measurements. This technique is not optimum, as it creates a great burden on the accuracy of each absolute pressure measuring system. Most of the differential pressures that one is interested in for the control of gas turbine engines are small percentages of the absolute magnitudes over which their components vary. Thus, a small percentage error in one component is essentially magnified by differencing the two absolute pressures to where it is a much larger percentage of the differential pressure. In some instances, when the differential pressure is very small, an error that would be acceptable in an accurate absolute pressure sensing system may mask the measurement altogether.

To alleviate this accuracy drawback, differential pressure transducers have been used in some instances. These transducers generally have two separate chambers each fed by one of the pressures to be differenced. One chamber communicates with one side of a pressure sensitive element of a transducer and the other chamber communicates with the opposite side. The pressure sensitive element, generally of the diaphragm type, differences the pressures mechanically by deflecting proportionally to each pressure and introduces substantially no error into the measurement. The variances of the electrical characteristic of the pressure sensitive element produced by the deflection is thus a function of the pressure difference.

These differential pressure sensors are not particularly advantageous however, for the control of gas turbine engines where the pressures to be measured are generally from contaminating sources. Many times the fluids whose pressures must be measured are very hot or cold, and many have entrained therein water vapor, droplets of engine oil, or other corrosive particulate matter. The small chambers and precision clearances necessary to provide a differential pressure sensor having a deflecting diaphragm with the accuracy required would soon become inoperable because of the contaminants. Further, for capacitive transducers when foreign material clings to the capacitor plates or electrodes, the pressure transduction may be unreliable because of the screening of the electrical field between them. If the material is corrosive, actual decomposition of the metallic plates of a capacitive transducer can occur.

SUMMARY OF THE INVENTION

The invention is a differential pressure measuring system including a first quartz capacitive capsule having a pressure sensitive capacitor for measuring the change in one absolute pressure, a second quartz capacitive capsule having a pressure sensitive capacitor for measuring the change in another absolute pressure, an alternating source of excitation voltage feeding one capsule in phase and one capsule 180° out of phase with the other, and means for summing the outputs of said capsules such that an error signal is formed. The error signal is nulled by the output of a multiplier used to excite a feedback capacitor connected in a closed loop manner back to another input of the summing junction. The gain of the multiplier is controlled by the magnitude of the output of an integrator which generates the time integral of the error signal. The integrator output is then a function of the excitation level required to produce a nulled error signal and hence is a function of the applied differential pressure.

In a second preferred implementation, the feedback capacitor may additionally comprise a quartz capacitive capsule having a pressure sensitive capacitor and a reference capacitor. The feedback capsule is exposed to one of the absolute pressures of the two that are differenced. In this manner a ratio of the differential pressure to the difference between the feedback capacitances can be obtained. This implementation is used to increase the accuracy of the pressure measuring system without the necessity of increasing the resolution capability.

These methods of determining a differential pressure maintain the inherent accuracy of measuring a differential pressure by the common deflecting element technique. No substantial error is introduced into the measurement until the output of the summing junction, and then the very high gain and high resolution of the feedback loop determines the differential pressure accurately.

Of additional significance is the fact that the electrodes or capacitances of these capsules are sealed and referenced to a pressure contained within the capsule. Even if the capsule is mounted to measure a pressure in a contaminating environment, such as the air inlet to a gas turbine engine, this will not effect its operation. The invention is therefore particularly useful in areas of a gas turbine engine where many conventional differential pressure sensors are not able to be mounted.

Further, the invention utilizes absolute pressure capsules of the quartz capacitive type that are mechanically rugged and capable of withstanding other environmental stress conditions, such as overpressure, without loss of accuracy. The quartz capsules are substantially superior to many other absolute pressure transducers.

Additionally, the invention has the advantages of providing an accurate pressure measuring system that needs no adjustment after an initial calibration. Zero and span adjustments are eliminated without the sacrifice of any accuracy.

Other objects, features, and aspects of the invention will be more clearly understood and better described if a reading of the detailed description is undertaken in conjunction with the appended drawings.

DETAILED DESCRIPTION OF THE PREFERRED EMBODIMENT OF THE INVENTION

Figure 1:
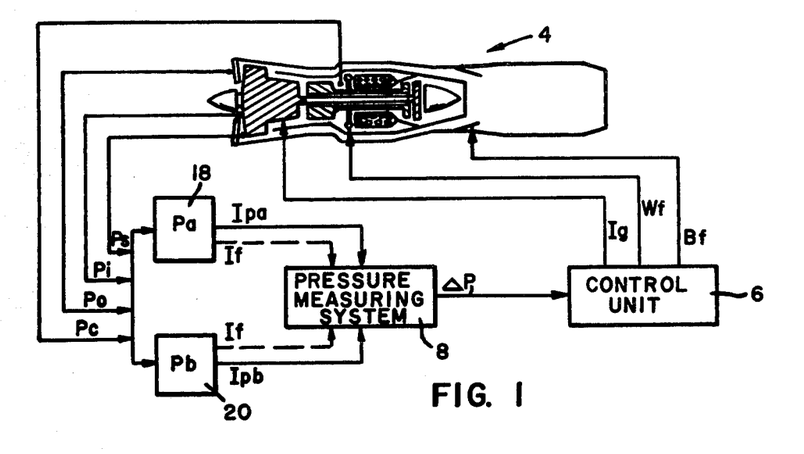
FIG. 1 is a system block diagram of a control system for a gas turbine engine when the control system utilizes a differential pressure measuring system constructed in accordance with the invention.

With respect to FIG. 1 there is illustrated a conventional gas turbine engine 4 of the turbo-fan type. The engine 4 comprises two compressors of the axial type, which are powered by a set of attached turbines. By mixing fuel from a fuel ring with the densified air output from the compressors a combustible fuel/air mixture is developed. This mixture is thereafter combusted in a combustion chamber to produce a highly energetic gas used to drive the turbines by expansion. In this type of reaction engine the energy not expended in driving the turbines is exhausted from a nozzle to produce a thrust. Additionally, a portion of the air drawn in by the low pressure compressor is diverted around the combustion section for mixture with the exhaust gases before reaching the nozzle.

Typically, there are a number of pressures to be measured that are useful in controlling this type of engine. They include the ambient pressure Po, the inlet impact pressure Pi, the inlet static pressure Ps, and the compressor pressure Pc. The typical stations where these pressures are usually available have been illustrated at points on the engine 4. It is known in the art that other pressures can be advantageously used in controlling gas turbine engines and those described have been shown only for exemplary purposes.

The invention is a pressure measuring system 8 which generates ar electrical signal to a generalized control unit 6 which is either the difference $\Delta P$ between the pressures of a chamber 18 and a chamber 20 or the pressure difference divided by a feedback term. Any of the aforementioned pressures can be communicated by suitable conduits to either of the chamber 18 and 20. Consequently, many desirable engine control parameters can be calculated directly for input to the controller 6. For example, if the compressor pressure Pc and the inlet pressure Pi are the variables chosen and communicated to chambers 18 and 20, respectively, then the difference Pa−Pb will produce an engine pressure differential representative of the compressor efficiency.

These control variables are transmitted to the control unit 6 where they are operated on according to generalized control laws to generate signals Ig indicative of the position of the guide vanes of the low pressure compressor, Wf indicative of the fuel flow to the engine, and Bf indicative of the position of the bypass flow nozzle. As known, many other engine control variables can be calculated in this manner.

The first embodiment of the differential pressure measuring system constructed in accordance with the teachings of the invention will now be more fully described with reference to FIG. 2. The system includes an alternating frequency generator 10 which generates alternating excitation signal Vr, −Vr at a certain frequency and amplitude. The excitation signals Vr, −Vr are preferably of the same amplitude and frequency, but of opposite phase. These signals could, for example, be generated by a sinusoidal generator connected to the primary of a transformer having a secondary winding with a grounded center tap.

The excitation signals feed a first pressure sensing capsule 14 and a second pressure sensing capsule 16. Pressure capsule 14 comprises a pressure sensitive capacitance Csa and a relatively pressure insensitive capacitance Cra. Similarly, pressure sensing capsule 16 comprises a pressure sensitive capacitance Csb and a relatively pressure insensitive reference capacitor Crb. Preferably, each capsule is a quartz capacitive transducer as will be more fully described hereinafter.

The two pressure sensitive capacitances of the capsules 14 and 16 are fed out of phase such that the excitation Vr is fed to the pressure sensitive capacitor Csa and the excitation, −Vr, 180° out of phase with the former excitation, is fed to the pressure sensitive capacitor Csb. In a manner similar to that just described, the realtively pressure insensitive reference capacitors of the capsules 14 and 16 are additionally fed out of phase. The reference capacitor Cra is fed by the excitation −Vr and the reference capacitor Crb if fed by the excitation Vr. It is noted that with these connections the excitation of the sense and reference capacitances of each capsule is also inverted.

The two outputs of the capsule 14 are combined via lead 15 to output a current Ipa to a summing junction 22. Additionally, the output leads of the capsule 16 are combined via lead 17 to output a current Ipb to the summing junction 22. Each of the pressure capsules 14 and 16 are mounted in the separate pressure chambers 18 and 20 of the system which communicate to pressures Pa and Pb, respectively. Conventional mounting techniques are utilized for exposing the capsules to the pressures in chambers 18 and 20.

The pressure sensitive capacitor Csa when fed by the excitation Vr develops a current proportional to its capacitance and likewise the reference capacitor Cra fed by the excitation −Vr develops a current proportional to its capacitance. These currents are differenced in the lead 15 because of their opposite polarities to become the current Ipa. It is readily evident that if Csa and Cra are equivalent at an initial reference pressure then the output current Ipa from the lead 15 will be zero. However, when Csa changes with variances in pressure the current Ipa will be generated proportional to the change in capacitance value of Csa due to the variances in pressure Pa. Since Csa may change either above or below the value of Cra, the polarity and magnitude of the current Ipa is proportional to the pressure Pa to be measured in chamber 18 as referenced to that initial pressure.

Similarly, the pressure sensitive capacitor Csb develops a current proportional to its capacitance and likewise the reference capacitor Crb develops a current proportional to its capacitance. These currents are differenced in the lead 17 because of their opposite polarities to provide a current Ipb. As with the previous capsule, Ipb is proportional to the change in the capacitance Csb and thus, proportional to the pressure Pb to be measured in chamber 20.

The currents Ipa, Ipb are subsequently combined in a summing junction 22. However, since the pressure sensitive capacitor Csa is fed 180° out of phase with the pressure sensitive capacitor Csb the output of the summing junction 22 will be an error current Ie which is the difference Ipa−Ipb. This current is then proportional to the differential pressure Pa−Pb.

It should be evident that the reference capacitor Cra, Crb are not necessary to the formation of an error current proportional to the pressure difference Pa−Pb. They are included in FIG. 2 to illustrate an advantageous use that provides a capacitance from capsules 14, 16 which is closer to zero at an initial reference pressure. Since the values of Csa and Csb are eventually differenced, in many applications, the reference capacitors will be superfluous.

The conversion of the error current Ie into a digital number is obtained by closing a loop around the summing junction 22 and calculating the amount of feedback current if that will be necessary to null or balance the error current. The resolution in the system in the digital domain is made by incrementally varying the feedback current IF and summing the increments necessary for balance to determine the differential pressure.

To accomplish this, the error current Ie is transmitted to a current-to-voltage amplifier 24 where it is multiplied by a gain KI. The amplitude of the alternating voltage, representing the magnitude of the error, is thereafter fed to a phase sensitive demodulator 26 which additionally has an input reference signal Vr from the generator 10. The error voltage output from amplifier 24 is demodulated and filtered into a DC voltage with an amplitude proportional to the error signal.

The DC voltage is transmitted through a filter 28 and is thereafter input to one port of a multiplexing analog to digital (A/D) converter 30. Another input for a second port of the A/D converter 30 is a temperature signal from a temperature sensor 50. The temperature signal is transmitted to the A/D converter 30 after amplification by amplifier 48 having a gain of K3. The temperature sensor generates a temperature signal indicative of the ambient temperature of the environment in which the system is operating. The temperature sensor is preferably located in physical proximity to the pressure chambers 18 and 20.

The A/D converter 30 transforms the analog signals input to both of its ports into digital numbers to be input to a digital processor, preferably a microprocessor, illustrated as block 46. The processor 46 could be included as part of the control unit 6 or a separate element. The digital numbers are input to the processor 46 through an input port 32.

The two digital signals representative of error and temperature are necessary to determine the differential pressure by a calibration mapping routine as will be more fully described hereinafter. The digital form of the error signal contains information as to the sign and magnitude of the error. The sign of the error indicates the direction in which the feedback current must be changed to balance the system while the magnitude of the error informs the system of the amount the feedback current must change to be in balance. This digital error signal can be any bit length required for the designed resolution of the system. The digital form of the temperature signal is generally of any required bit size and contains information as to the magnitude of the ambient temperature.

The input port is further connected to a digital integrator 34 with a gain of K2. The integrator 34 can be implemented as an internal processor register whose size of incrementation is a function of the magnitude of the error signal. Additionally, the input port can transmit the digital input to a calibration mapping routine 36. The output of the digital integrator, which is a digital number N, is fed back to the summing junction 22 through an output port 38 under supervision of the sequencer 44 to a register 40. The sequencer 44, internal to the microprocessor as either hardware or software communicates with the input port 32, output port 38, A/D converter 30, and register 40, to synchronize the process of inputting and outputting the digital numbers.

The digital number N stored in the register 40 is thereafter converted to an analog alternating signal by a multiplying digital-to-analog converter (MDAC) 42. The MDAC 42 receives as another input −Vr from the reference generator 10 via lead 52. Depending on the digital number N input, the MDAC 42 will output an alternating signal −Vrf(N) which has a frequency and phase equivalent to Vr and an amplitude which is a function of N. Consequently, a feedback excitation signal is generated in phase with the reference Vr and of an amplitude proportional to the digital number N.

The feedback excitation signal is applied to a relatively stable feedback capacitance Cf. The capacitance Cf transforms the signal into a feedback current If which is substracted from the summing junction 22. The feedback current is increased or decreased incrementally by the counting of the digital integrator 34 until the loop is balanced and the error current is nulled.

Figure 8:
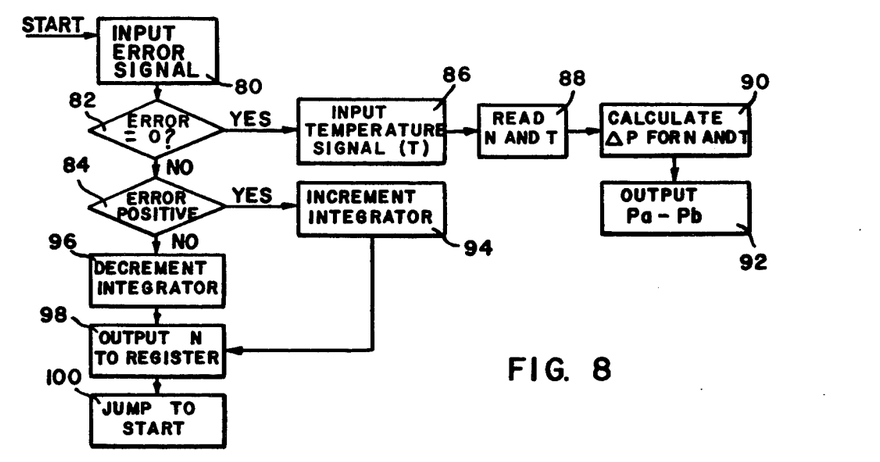
FIG. 8 is a pictorial representation of a system fow chart of the steps utilized in the feedback loop of the systems illustrated in FIGS. 2 and 3.

The flow chart illustrated in FIG. 8 will now be used to further describe the conversion of the error signal into a digital number N. This flow chart represents the functional steps in a program stored in processor 46 for converting the measured differential pressures into a digital number. The program can be a part of a major fuel control program where it is called as a subroutine or a separate stand alone block where the result is output directly to control unit 6. The sequence of process steps begins by inputting the error signal as indicated by block 80. This is accomplished by signalling the A/D converter 30 that the DC error signal from phase compensation circuit 28 should be converted to a digital number. After the conversion, the output of the A/D converter is transferred to a register internal to the processor for storage by means of the input port 32.

The error signal which has a magnitude and sign is thereafter tested during process steps 82 and 84. The error signal is first tested in block 82 to determine if its magnitude is greater than zero. If non zero, then the digital number N is not indicative of the error signal and the loop has not settled. Therefore, an indication of which direction to increment the number N must be found.

The test accomplished in block 84 provides this indication. If the error signal is positive, then the error current Ie is larger than the feedback current IF and integrator 34 is incremented by step 94 to increase the feedback current. If the error signal is negative, then the error current Ie is less than the feedback current If and integrator 34 is decremented by step 96 to decrease the feedback current.

After steps 94 or 96 is finished, the new digital number N will be output to register 40 through the output port 38 during step 98. The number N is fed back to vary the error current in a direction to null the loop through the MDAC 42 and feedback capacitor Cf. This process is continued by jumping to block 80 from block 100 after the number N is output.

The integration rate for integrator 34 will be a function of the program execution time and the size of the increment input to the integral stored each pass. The sequencer can be made to change either of these parameters and thus make the integration rate variable. A variable integration rate would be advantageous, for example, when it is desired that the settlement time of loop be improved. In such a case, as taught by Sell et al., the integration rate would be increased for larger error currents and reduced for N numbers near the balance point.

The program will continue to vary the feedback current by increments in this manner until the error current is nulled. When this occurs, the sequence will flow from the test in block 82 to block 86. At this time the sequencer 44 will signal A/D converter 30 to convert the output of the temperature sensor 50 into a digital number. The temperature signal T will then be input through the input port 32 and stored. This step in the sequence is illustrated as block 86. The system will now begin a calibration cycle where the stored values of N and T are read during step 88 and the corresponding ΔP value found from a calculation accomplished by block 90.

The calculation step can be accomplished by one of two alternative methods. In the first, a look-up table of the values of the number N, differential pressure ΔP, and temperature T is composed empirically. An initial calibration is formed by exposing the system to a matrix of known differential pressures and temperatures and recording the digital number N produced for each point. Each point is placed in a memory element such as a read only memory (ROM) to form a look-up table. The look-up table may then be used to find the differential pressure Pa−Pb which corresponds to the measured values for N and T during gas turbine engine operation. If necessary an interpolation routine can be used to find the differential pressure between two empirical points.

Figure 9:
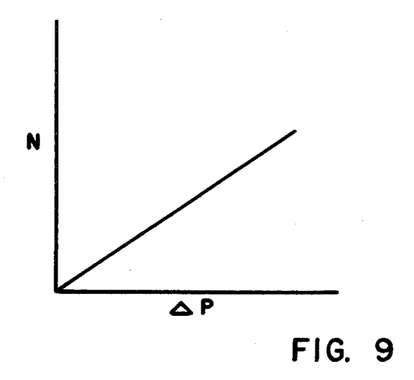
FIG. 9 is a graphical representation of the values of N numbers as a function of differential pressure for the first embodiment of the invention.

An alternate method is to derive, from the calibration data for known pressures and temperatures, an equation for the differential pressure ΔP as a function of the variables N and T. Then to obtain an indication of an unknown differential pressure, this equation can be executed in the software loop to convert the measured parameter N and T to a representation of the unknown differential pressure. The differential pressure Pa−Pb is thereafter output during step 92 to a be directly used by control unit 6 or for use in a larger program or processor. A representative calibration characteristic of N versus ΔP is illustrated in FIG. 9.

While a digital software implementation of the feedback loop has been described for indicating the preferred embodiment of the invention, it will be obvious to one skilled in the art that the feedback circuitry illustrated in the referenced Sell et al. application could just as easily be used. In such an instance, the feedback circuitry illustrated in FIG. 4 of that application as elements 14, 16, 26, and 28, could be readily substituted for the digital loop to take the error current Ie and convert it into a feedback signal −Vr f(n). Moreover, the system loop could also be implemented in a totally analog configuration. In that case the loop would include analog amplification, demodulation, and integration to output an analog output signal representative of the differential pressure. The feedback loop would utilize an analog multiplier controlled by the output signal to null the loop.

Since the system in the steady state is essentially configured as an operational amplifier (pure amplifier with an infinite gain) the system transfer function for the output N can be envisioned as substantially equivalent to: $N = X_f/X_m \, N_{max}$, where $X_f$ is the reactance of the feedback loop, Xm is the reactance of the pressure measuring input, and Nmax is the maximum digital output from the system.

In the first embodiment, then:

$$Xf = 1/(2\pi f)Cf$$

$$Xm = \frac{1}{(2\pi f)((Csa - Cra) - (Csb - Crb))}$$

therefore:

$$N = \frac{(Csa - Cra) - (Csb - Crb)}{Cf} \text{ Nmax}$$

Since Csa varies with Pa; Csb varies with Pb; and Cra, Crb, and Cf are relatively fixed, then N is proportional to:

(Pa−Pb) Nmax

Figure 2:
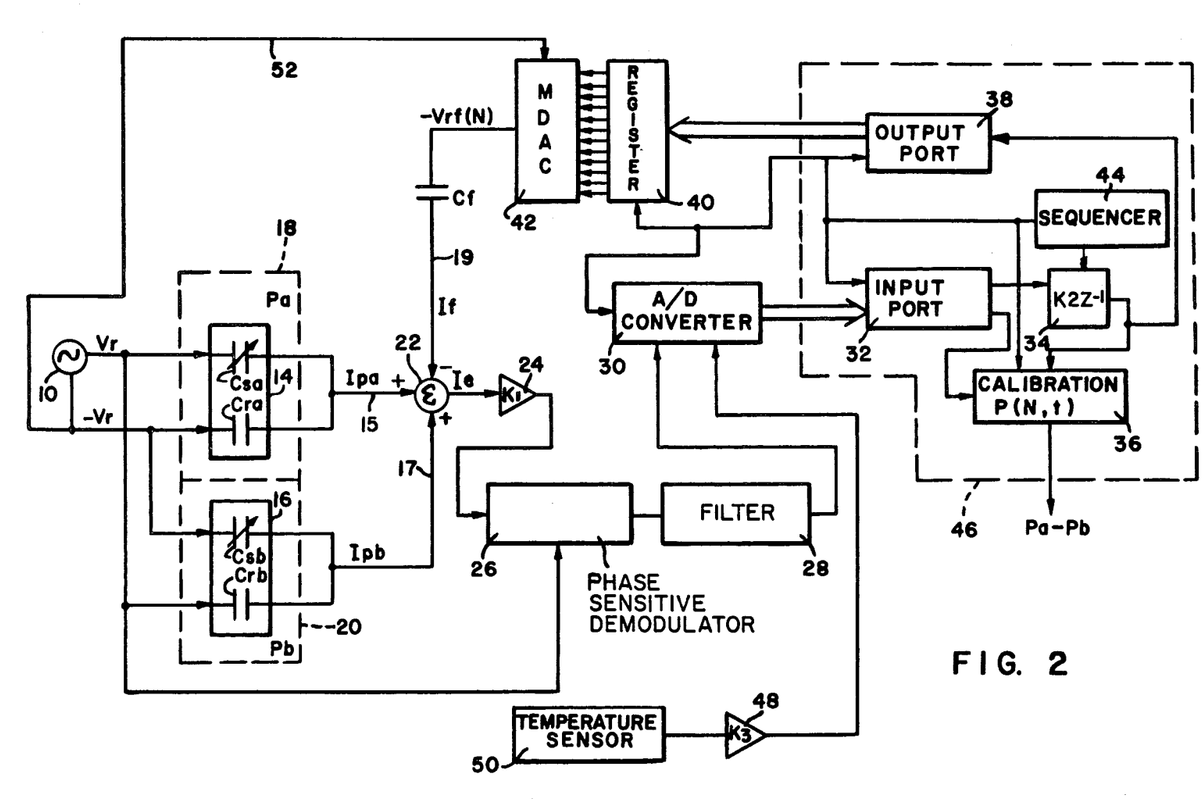
FIG. 2 is an electrical schematic view in block diagram form of a differential pressure measurement system constructed in accordance with the invention.
Figure 3:
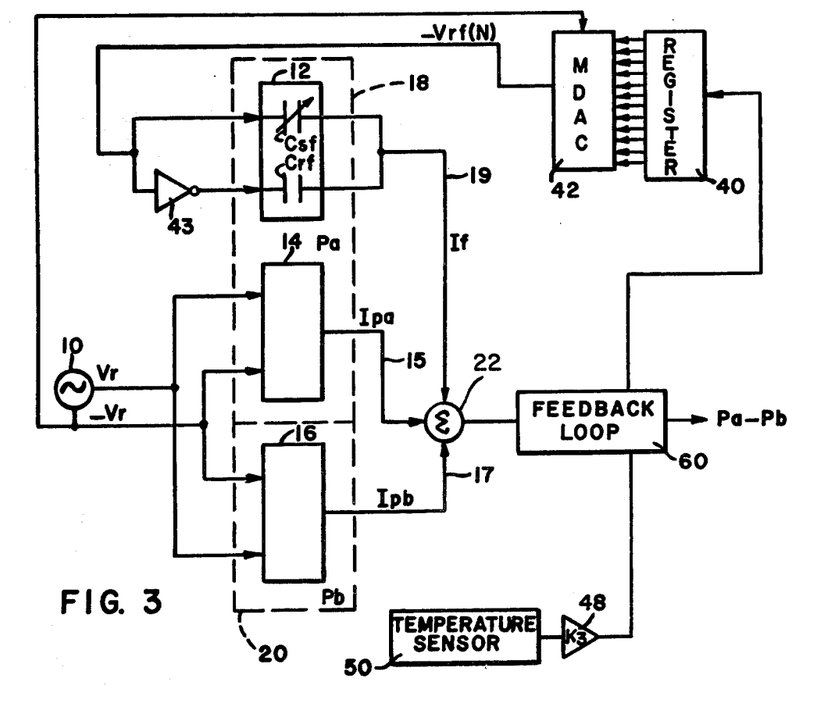
FIG. 3 is an electrical schematic view in block diagram form of a second embodiment of the pressure measurement system illustrated in FIG. 2 where the differential pressure is ratioed with the difference of two feedback capacitances.

In a second preferred embodiment of the invention, illustrated in FIG. 3, the previously fixed feedback capacitor Cf has been replaced by another quartz pressure transducer capsule 12. The other elements of the pressure measuring system are unchanged and thus like numerals for identical elements in both embodiments have been retained. The feedback circuitry consisting in FIG. 2 of elements 24, 26, 28, 30, and 46 has been consolidated into element 60 for purposes of clarity.

The feedback capsule 12 has pressure sensitive capacitance Csf and a relatively pressure insensitive capacitance Crf. The capacitors are fed out of phase by splitting the feedback signal −Vr F(N) generated from the MDAC 42. The capacitor Csf is excited directly by the feedback signal and a 180° phase shift is provided by inverting amplifier 43 for the reference capacitor Crf. The outputs of the capsule 12 are differenced in lead 19 to become the feedback current IF for the second embodiment.

The capsule 12 is placed in one of the pressure chambers 18 or 20 to provide a pressure variable term in the denominator of the system transfer function. In the implementation illustrated, the capsule 17 is placed in the pressure chamber 18. Therefore, the transfer function as previously indicated is:

$$N = Xf/Xm \text{ Nmax}$$

where Xf is the reactance of the feedback loop and is now equal to $$\frac{1}{(2\pi f)(Csf - Crf)}, \text{ and}$$

where Xm is the reactance of the measuring part and is equal to $$1/(2\pi f) ((Csa-Cra)-(Csb-Crb))$$

which reduces to $$N = \frac{(Csa - Cra) - (Csb - Crb)}{(Csf - Crf)} \text{ Nmax}$$

Since Csa and Csf vary with Pa; Csb varies with Pb; and Cra, Crb, and Crf are relatively fixed, then the numerator of N is proportional to:

Pa−Pb Nmax

In operation, the embodiment shown in FIG. 3 measures the differential pressure in the same manner as the system illustrated in FIG. 2. Specifically, the feedback current If is incremented, in one direction or the other, until the error current Ie is forced to a null value. At that time the temperature signal T and the digital number N are communicated to a calibration routine. A look-up table where values of Pa−Pb have been stored is interrogated with respect to the measured number N and temperature T to yield the final differential.

Figure 10:
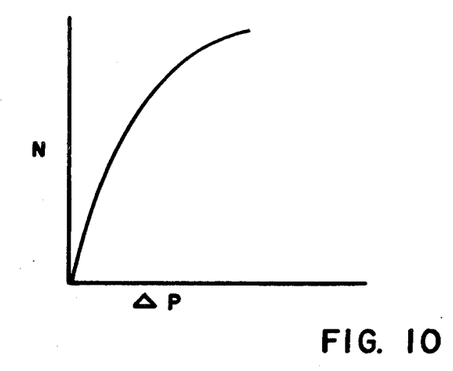
FIG. 10 is a graphical representation of the values of N numbers as a function of differential pressure for the second embodiment of the invention.

However, because of the pressure sensitive difference in the denominator of the transfer function, the resolution of the system is improved. More of the N numbers are available for resolution of the differential pressure at small values. This calibration is shown graphically in FIG. 10 where the slope of the N versus ΔP characteristic is larger for small values of ΔP and increasing smaller for larger values of ΔP. As taught by the referenced Sell et al. application, this particular N versus P characteristic permits a constant accuracy for operating point across a fairly wide pressure range.

Figures 4, 5, 6, 7:
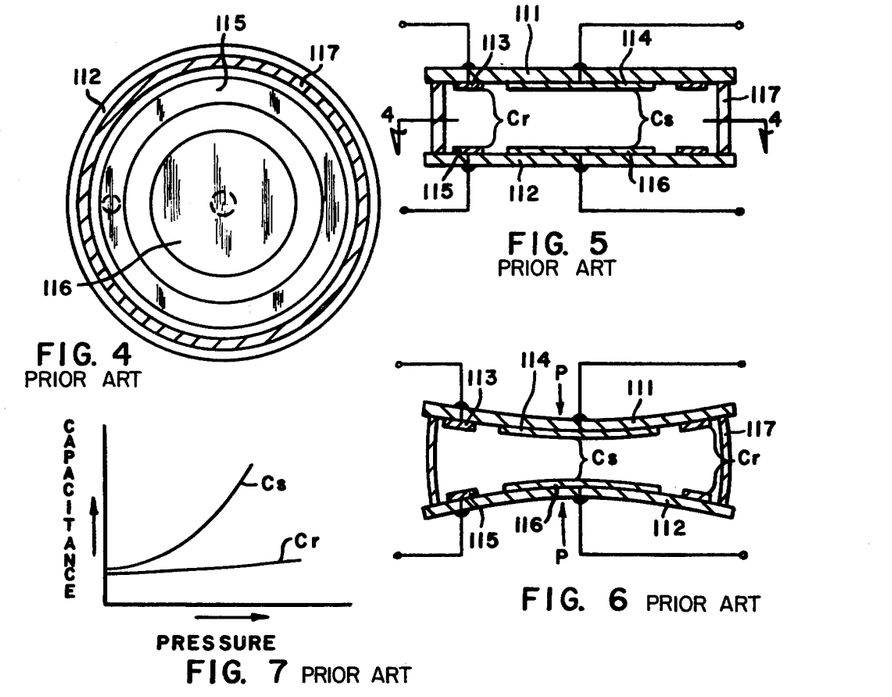
FIG. 4 is a cross-sectional top view of a quartz capacitive pressure capsule as utilized in the embodiment of the invention illustrated in FIGS. 2 and 3.
FIGS. 5 and 6 are cross-sectional side views of the capsule illustrated in FIG. 4 in an unpressurized and a pressurized state, respectively.
FIG. 7 is a graphical representation of the capacitance change as a function of pressure for the capsule illustrated in FIGS. 4, 5, and 6.

FIGS. 4, 5, and 6, illustrate the preferred implementation of the quartz capacitive capsules which are schematically shown in FIGS. 2 and 3 as elements 12, 14, and 16. Each transducer comprises two relatively flat opposing discs 111, 112, of quartz or a similar vitreous material with similar temperature and flexion characteristics. Quartz is preferable because its deflection characteristics with respect to pressure is relatively large, while changes in that characteristic with respect to temperature is relatively insignificant.

On the inner face of each disc, for example, disc 112, there is formed two capacitor plates 115 and 116 of some conductive material by a screening or vapor deposition process or the like. Preferably, the plates are comprised of a noble metal such as copper, gold, silver, or a similar material. Plate 116 is circular in shape and substantially centrally located on the disc while plate 115 is ring-shaped and peripherally positioned on the disc 112 surrounding the inner plate 116. After formation of the plates 115 and 116 on disc 112 and formation of similar plates 113 and 114 on disc 111, the discs are joined by an annular frit 117 along their peripheral edge to form a gap between them. The frit 117 is of an insulating material and the interior of the transducer is evacuated or set at a reference pressure Pr.

As is seen in FIG. 6, a change in outside pressure P will cause a deformation of the discs 111, 112 and vary the gap distance between the quartz discs. This flexion varies the distance between capacitor plates 113 and 115 and thus varies the capacitance of the pressure variable capacitor Cs formed of those plates. Normally, the reference capacitor Cr formed of the plates 113 and 115 does not change capacitance appreciably and can be used for reference compensation as previously described.

This operation results from the fact that the central portions of the discs are easily deflectable while the portions adjacent the edges are relatively nondeflectable. The generalized response of the transducer capsule for a change in capacitance due to a change in pressure is illustrated in FIG. 7. A capacitive pressure transducer of this type is more fully disclosed in a commonly assigned U.S. Pat. No. 3,858,097 issued to Polye, the disclosure of which is hereby expressly incorporated by reference herein.

While a detailed description of the preferred embodiments has been disclosed, it will be obvious to those skilled in the art that various modifications and changes may be made thereto without departing from the scope and spirit of the invention as hereinafter defined in the appended claims.

What is claimed is:

1. A differential pressure measuring system comprising:
   means for generating first and second alternating reference signals having a predetermined phase relationship therebetween;
   a first pressure sensitive impedance, responsive to a first pressure, driven by said first reference signal for generating a signal proportional to the change in the first pressure;
   a second pressure sensitive impedance, responsive to a second pressure, driven by said second reference signal for generating a signal proportional to the change in the second pressure;
   means, electrically connected to said first and second impedances, for generating an analog error signal which is proportional to the difference between said first and second pressures;
   means for converting said analog error signal into a digital error signal;
   means for integrating said digital error signal and generating a digital output number N therefrom;
   means for converting said digital output number into an alternating feedback signal of the same phase as one of said reference signals; wherein said feedback signal is fed back to said analog error signal generating means through a feedback impedance to null said analog error signal; and
   said digital output number N being representative of the difference in said first and second pressures when the digital error is nulled.

2. A differential pressure measuring system as defined in claim 1 wherein:
   said first pressure sensitive impedance is a capacitance.

3. A differential pressure measuring system as defined in claim 2, wherein:
   said second pressure sensitive impedance is a capacitance.

4. A differential pressure measuring system as defined in claim 3, wherein:
   said feedback impedance is a capacitance.

5. A differential pressure measuring system as defined in claim 4, wherein:
   said first and second alternating reference signals are 180° out of phase.

6. A differential pressure measuring system including a first absolute pressure sensing capsule exposed to a pressure, a second absolute pressure sensing capsule exposed to another pressure, a feedback absolute pressure sensing capsule exposed to said pressure to which the first absolute pressure sensing is exposed, means for generating excitation signals for driving said first and second absolute pressure sensing capsules with excitation signals 180° out of phase of one another to generate output signals from each of said first and second absolute pressure sensing capsules, said feedback absolute pressure sensing capsule having an output signal, means for taking the difference between the sum of said output signals from said first and second absolute pressure sensing capsules and the output signal from said feedback absolute pressure sensing capsule to generate an error signal, means for producing a digital signal which is incremented at a predetermined rate while the error signal is not equal to zero, and means for feeding said digital signal to said feedback capsule to generate said output signal of the feedback absolute pressure capsule.

7. A differential pressure measuring system as defined in claim 6 wherein:
   said second absolute pressure sensing capsule is a quartz pressure transducer including a pressure sensitive capacitor and a relatively pressure insensitive reference capacitor; said reference capacitor being fed by an excitation signal 180° out of phase with the excitation signal of said pressure sensitive capacitor of the second capsule.

8. A differential pressure measuring system as defined in claim 7, wherein:
   said first absolute pressure sensing capsule is a quartz pressure transducer including a pressure sensitive capacitor and a relatively pressure insensitive reference capacitor; said reference capacitor being fed by an excitation signal 180° out of phase with the excitation signal of said pressure sensitive capacitor of the second capsule.

9. A differential pressure measuring system as defined in claim 8, wherein:
   the digital signal during steady state condition is proportional to:

$$\frac{(Csa - Cra) - (Csb - Crb)}{Cf} \text{Nmax}$$

where Csa, Csb are the pressure sensitive capacitances of the first and second absolute pressure sensing capsules, respectively; Cra, Crb are the relatively pressure insensitive capacitances of the first and second capsules, respectively; Cf is the capacitance of the feedback capacitor; and Nmax is the maximum digital number attainable for the digital signal.

10. A differential pressure measuring system as defined in claim 8, wherein:
    said feedback absolute pressure sensing capsule is a quartz pressure transducer including a pressure sensitive capacitor excited by an alternating signal and a relatively pressure insensitive reference capacitor; said reference capacitor being fed with an excitation signal 180° out of phase with the alternating signal exciting said pressure sensitive capacitor of the feedback capsule.

11. A differential pressure measuring system as defined in claim 10, wherein:
    the digital signal during steady state condition is proportional to:

$$\frac{(Csa - Cra) - (Csb - Crb)}{(Csf - Crf)} \text{Nmax}$$

where Csa, Csb, and Csf are the pressure sensitive capacitances of the first, second, and feedback absolute pressure sensing capsules, respectively; Cra, Crb, Crf are the relatively pressure insensitive capacitances of the first, second, and feedback capsules respectively, and Nmax is the maximum digital number attainable for the digital signal.

* * * * *